United States Patent
Kuczynski et al.

(10) Patent No.: US 8,544,337 B2
(45) Date of Patent: Oct. 1, 2013

(54) PIEZOELECTRIC CHROMIC IMPACT SENSOR

(75) Inventors: Joseph Kuczynski, Rochester, MN (US); Arvind K. Sinha, Rochester, MN (US); Kevin A. Splittstoesser, Stewartville, MN (US); Timothy J. Tofil, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 527 days.

(21) Appl. No.: 12/754,851

(22) Filed: Apr. 6, 2010

(65) Prior Publication Data
US 2011/0239790 A1 Oct. 6, 2011

(51) Int. Cl.
*G01L 1/00* (2006.01)

(52) U.S. Cl.
USPC .......................................................... 73/777

(58) Field of Classification Search
USPC .................................... 73/762, 777; 116/203
See application file for complete search history.

(56) References Cited

U.S. PATENT DOCUMENTS

| | | | |
|---|---|---|---|
| 4,138,357 A | 2/1979 | Igarashi | |
| 5,394,824 A * | 3/1995 | Johnson, Jr. | 116/203 |
| 6,301,038 B1 | 10/2001 | Fitzmaurice et al. | |
| 6,807,012 B2 * | 10/2004 | Marco | 359/676 |
| 6,870,657 B1 | 3/2005 | Fitzmaurice et al. | |
| 7,073,667 B2 * | 7/2006 | Burns et al. | 206/710 |
| 7,256,925 B2 * | 8/2007 | Noh et al. | 359/265 |
| 7,403,319 B2 | 7/2008 | Leyland et al. | |
| 7,420,727 B2 | 9/2008 | Cassidy | |
| 7,508,009 B2 | 3/2009 | Edwards et al. | |
| 8,074,489 B2 * | 12/2011 | Ishikawa et al. | 73/12.04 |
| 8,104,324 B2 * | 1/2012 | Hennig et al. | 73/12.01 |
| 2003/0169574 A1 | 9/2003 | Maruyama et al. | |

FOREIGN PATENT DOCUMENTS

| | | | |
|---|---|---|---|
| GB | 2457666 | * | 8/2009 |
| JP | 09-054043 | * | 2/1997 |
| JP | 09054043 | * | 2/1997 |

OTHER PUBLICATIONS

"Impact Indicators" data sheet, ShockWatch, Inc., Dallas, Texas, 4 pages, updated Jan. 2010. Retrieved from http://www.shockwatch.com/pdfs/ds_impact_indicators.pdf.
"Impact & Environmental Recorders" data sheet, ShockWatch, Inc., Dallas Texas, 4 pages, updated Jan. 2010. Retrieved from http://www.shockwatch.com/pdfs/ds_impact_environ_recorders.pdf.

(Continued)

*Primary Examiner* — Lisa Caputo
*Assistant Examiner* — Octavia D. Hollington
(74) *Attorney, Agent, or Firm* — Matthew J. Bussan

(57) ABSTRACT

An impact sensor includes a piezoelectric transducer operatively connected to a chromic device. The chromic device includes a chromic material that changes from a first color state to a second color state in response to electric power generated by the piezoelectric transducer when exposed to a given level of impact force. The chromic material is bistable so that the chromic material remains in the second color state for a significant amount of time. An impact force to which the sensor has been subjected may be quantified by observing the chromic device. In one embodiment, the chromic material is an electrochromic material, such as a viologen, that changes through a color gradient of light transmission states from the first color state to the second color state. A printed color gradient may be used to aid in quantifying the impact force. In another embodiment, the chromic device includes a thermochromic material.

4 Claims, 10 Drawing Sheets

(56) References Cited

OTHER PUBLICATIONS

Wikipedia contributors, "Thermochromism", Wikipedia, The Free Encyclopedia, 5 pages, Feb. 24, 2010, 00:17 UTC. Retrieved from http://en.wikipedia.org/w/index.php?title=Thermochromism&oldid=345989511.

Matthias Marescaux, "The Basics of Electrochromic Displays", Liquid Crystals & Photonics Group—Ghent University (Belgium), 4 pages, Copyright 2006 Universiteit Gent. Retrieved from http://trappist.elis.ugent.be/ELISgroups/lcd/tutorials/tut_echrom.php.

Colin Pratt, "Chromism", 17 pages, Feb. 3, 2005. Retrieved from http://homepage.ntlworld.com/colin.pratt/Chromism.pdf.

"Monolith Construct", NTERA, Inc., 1 page, Copyright 2010 NTERA, Inc. Retrieved from http://www.ntera.com/technology/monolith_construct.php.

InnoCentive Challenge (www.innocentive.com), Innocentive #8135777, 5 pages, Apr. 3, 2009.

* cited by examiner

PIEZOELECTRIC CHROMIC IMPACT SENSOR

BACKGROUND OF THE INVENTION

1. Field of Invention

The present invention relates in general to impact sensors. More particularly, the present invention relates to an impact sensor that includes a piezoelectric transducer operatively connected to a device that changes color states in a bistable manner in response to electric power generated by the piezoelectric transducer when exposed to impact force.

2. Background Art

Impact indicators are commonly used to show when a product has been subjected to an impact exceeding a specified level. Impact indicators are typically used to monitor products that are fragile or otherwise sensitive to impact. Impact may occur, for example, during the product's manufacture, transportation or storage.

The impact indicator, which is typically a disposable, single-use device, is typically affixed directly to the product or packaging. The impact indicator detects and records an impact exceeding a user-specified detection threshold (e.g., 50 G for 50 ms).

Impact indicators are typically available with different sensitivities (e.g., 10 G for 50 ms, 25 G for 50 ms, 50 G for 50 ms, 75 G for 50 ms, and 100 G for 50 ms), each providing a different user-specified detection threshold. Such impact indicators are typically limited to a maximum user-specified detection threshold of about 100 G (50 ms).

Impact indicators typically employ the fracturing of a dye filled glass tube, rupturing of tiny dye filled spheres, or other rigid materials sensitive to impact. These devices generally provide a qualitative measure of severe impact and do not indicate how much force was applied to a monitored product or material.

For example, the impact indicator will activate only if the user-specified detection threshold is reached (it will not activate if the detection threshold is not reached). If the impact indicator activates, it does so in a manner that does not quantify the amount by which the user-specified detection threshold may have been exceeded. This information may be useful. On the other hand, if the impact indicator does not activate, it does not provide any indication of a near-miss with respect to the user-specified detection threshold. Again, this information may be useful.

Another solution is to use a conventional impact recorder that electronically measures information such as impact force and duration, as well as the time and date of impact. For example, the ShockLog RD298 impact and environmental recorder (available from ShockWatch, Inc Dallas, Tex.) uses triaxial piezoelectric accelerometer technology to record direction, amplitude, and duration of impact force, as well as the date and time of up to 400 shock and vibration events. Though more sophisticated and robust than impact indicators, such conventional impact recorders are relatively costly.

Therefore, a need exists for an enhanced impact sensor that will detect and measure rough handling and impact damage.

SUMMARY OF THE INVENTION

According to the preferred embodiments of the present invention, an impact sensor includes a piezoelectric transducer operatively connected to a chromic device. The chromic device includes a chromic material that changes from a first color state to a second color state in response to electric power generated by the piezoelectric transducer when exposed to a given level of impact force. The chromic material is bistable so that the chromic material remains in the second color state for a significant amount of time. An impact force to which the sensor has been subjected may be quantified by observing the chromic device. In one embodiment, the chromic material is an electrochromic material, such as a viologen, that changes through a color gradient of light transmission states from the first color state to the second color state. A printed color gradient may be used to aid in quantifying the impact force. In another embodiment, the chromic device includes a thermochromic material.

BRIEF DESCRIPTION OF THE DRAWINGS

The preferred exemplary embodiments of the present invention will hereinafter be described in conjunction with the appended drawings, where like designations denote like elements.

DETAILED DESCRIPTION OF THE PREFERRED EMBODIMENTS

1. Overview

Figure 1:
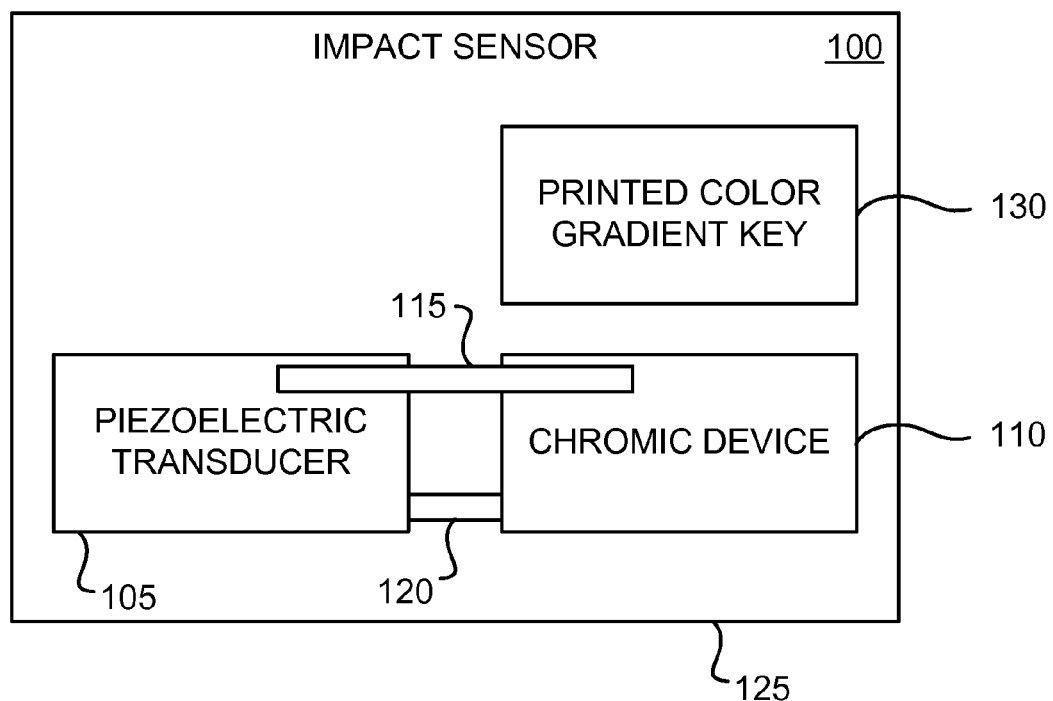
FIG. 1 is a block diagram illustrating an embodiment of a piezoelectric chromic impact sensor in accordance with the present invention.

In accordance with the preferred embodiments of the present invention, an impact sensor includes a piezoelectric transducer operatively connected to a chromic device (e.g., an electrochromic device (ECD) or a thermochromic device). The chromic device includes a chromic material that changes from a first color state to a second color state in response to electric power generated by the piezoelectric transducer when exposed to a given level of impact force. The chromic material is bistable so that the chromic material remains in the second color state for a significant amount of time. An impact force to which the sensor has been subjected may be quantified by observing the chromic device. In one embodiment, the chromic material is an electrochromic material, such as a viologen, that changes through a color gradient of light transmission states from the first color state to the second color state. A printed color gradient key may be used to aid in quantifying the impact force. In another embodiment, the chromic device includes a thermochromic material.

2. Detailed Description

In accordance with the preferred embodiments of the present invention, an impact sensor is provided that includes a piezoelectric transducer operatively connected to a chromic device (e.g., an electrochromic device (ECD) or a thermochromic device). The chromic device changes color states in a bistable manner in response to electric power generated by the piezoelectric transducer when exposed to impact force.

Certain terminology is used in the following description for convenience only and is not limiting. For example, the words "atop", "upper", "lower", "top", "bottom", "left", and "right" designate directions in the drawings to which reference is made.

As used herein, the phrase "operatively connected" means that two or more elements are connected to each other by function whether they are connected physically, directly, indirectly, chemically, or the like. For example, chromophoric redox material is operatively connected to a conductor even if it is not directly and physically attached to the conductor if application of electrical charge, voltage, current or the like causes modulation of the chromophoric redox material.

As used herein, the phrase "piezoelectric transducer" (PZT) means a device that utilizes a piezoelectric material to convert mechanical energy into electrical energy. Piezoelectricity is the ability of such materials to generate an electric potential in response to applied mechanical stress. Certain crystals (notably quartz and Rochelle salt) are piezoelectric materials, as are some ceramics. Particularly noteworthy as a suitable piezoelectric material is polyvinylidene fluoride (PVDF) as it can easily be cast into a thin film and exhibits greater than 2× the piezoelectric effect of quartz.

As used herein, the phrase "chromic device" means a device that utilizes a chromic material, i.e., a substance that exhibits chromism. Chromism is a reversible (typically) change in the color state of such a material caused by some form of stimulus. Though the change in the color state of a chromic material is typically reversible, chromic materials may be bistable, i.e., stable in two or more color states. Many materials are chromic, including inorganic and organic compounds, as well as conducting polymers. There are several types of chromism, including thermochromism and electrochromism.

Thermochromism is the reversible (typically) change in the color state of a substance induced by temperature change. As used herein, the phrase "thermochromic material" means a substance that exhibits thermochromism. A large variety of substances exhibit this phenomenon, including inorganic, organic, organometallic, supramolecular and polymeric systems. Examples of thermochromic materials include, but are not limited to, bianthrones, cobalt hexacyanoferrate, the zirconocene complex of 1,4-diphenyl-1,3-butadiene and poly (3-alklthiophene). Several liquid crystal materials such as cholesteryl nonanoate or cyanobiphenyls can be used directly, or leuco dyes can be easily incorporated into any easily castable polymer (such as poly(methyl methacrylate) PMMA, for example) to form a thin film thermochromic material.

Electrochromism is the reversible (typically) change in the color state of a substance induced by a change in electronic state. As used herein, the phrase "electrochromic material" means a substance that exhibits electrochromism. An electrochromic material is able to change its color state by absorbing an electron (the material is reduced) or by ejecting an electron (the material is oxidized). Three classes of electrochromic material are known. Accordingly, electrochromic materials are often referred to as being Type I, Type II or Type III.

Type I electrochromic materials are soluble and remain in solution during usage.

Type II electrochromic materials are soluble in their neutral state and form a solid on the electrode after electron transfer.

Type III electrochromic materials are solid and remain solid during usage.

Electrochromic materials used in making electrochromic devices (ECDs) typically fall into three groups: metal oxide films (Type III, inorganic); conducting polymers (Type III, organic); and molecular dyes (Type I). Examples of electrochromic materials include, but are not limited to, viologens such as 1,1'-diethyl-4,4' dipyridilium dichloride (also known as ethyl viologen or EV) and 1,1'-dimethyl-4,4' dipyridilium dichloride (also known as methyl viologen or MV). The viologens are typically the dichloride salts, though other anions are possible. Electrochromic materials are sometimes referred to herein as "chromophoric redox materials", "redox chromophores", and "electrochromophores".

As used herein, the phrase "color state" means a color exhibited by the chromic material. For example, the coloring of ethyl viologen (EV) changes from completely transparent (first color state, $EV^{++}$) to intense blue (second color state, $EV^+$) via reduction of each EV molecule. This change in color state is reversible. The coloring of the EV changes from intense blue (second color state, $EV^+$) to pale blue (third color state, $EV^0$) via reduction of each EV molecule. This latter reduction, however, is irreversible.

Electrochromic devices (ECDs) typically exhibit dramatic (easy to observe) color state differences. In ECDs employing molecular dyes (Type I) such as ethyl viologen (EV), for example, the color state typically changes between the transparent state and the dark state. Between these different color states (e.g., the transparent state and the dark state), a complete set of tones may be obtained by varying the voltage applied to the ECD. As used herein, the phrase "light transmission state" means one tone within the set of tones from one color state to another color state. For example, ethyl viologen (EV) changes through a color gradient of light transmission states from the transparent state to the dark state. In this case, each light transmission state may be expressed as a percentage of the ultimate change in the % transmittance of light when the EV is in the dark color state.

As used herein, the phrase "bistable" means stable in two or more color states (and, preferably, stable in the light transmission states between the two or more color states as well). A chromic material that is bistable remains in each of the two or more color states (and, preferably, in each of the light transmission states therebetween as well) for a significant amount of time (e.g., many minutes, hours, days or weeks) after removal of the stimulus that caused the change in color state. With regard to ECDs, electrochromic memory is the ability of an electrochromic material to hold its color with no current applied thereto.

Figure 2:
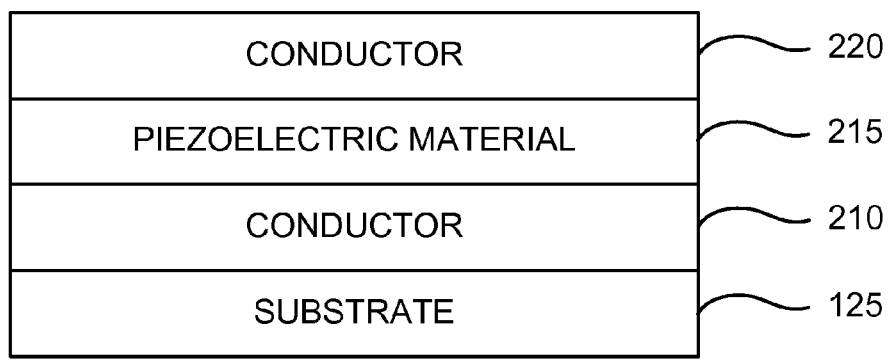
FIG. 2 is a block diagram illustrating an exemplary embodiment of the piezoelectric transducer of the piezoelectric chromic impact sensor in FIG. 1.
Figure 3:
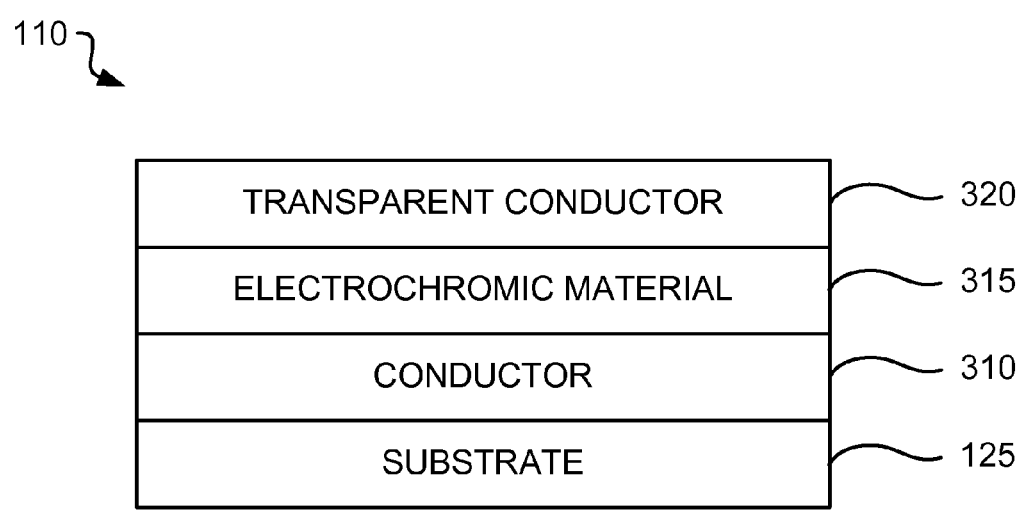
FIG. 3 is a block diagram illustrating an exemplary embodiment of the chromic device of the piezoelectric chromic impact sensor in FIG. 1, in which an electrochromic device is utilized as the chromic device.

FIG. 1 is a block diagram illustrating a piezoelectric chromic impact sensor 100 in accordance with an embodiment of the present invention. The impact sensor 100 includes a piezoelectric transducer 105 that is operatively connected to a chromic device 110 through an upper electrical connection 115 and a lower electrical connection 120. The piezoelectric transducer 105 and the chromic device 110 may be conventional. An exemplary embodiment of the piezoelectric transducer 105 is illustrated in FIG. 2, and an exemplary embodiment of the chromic device 110 is illustrated in FIG. 3.

The upper electrical connection 115 may be a wire, conductive trace (e.g., copper) or foil electrically connecting a conductor of the piezoelectric transducer 105 (e.g., the upper conductor 220 of the piezoelectric transducer 105 illustrated in FIG. 2, discussed below) to a conductor of the chromic device 110 (e.g., the upper conductor 320 of the chromic device 110 illustrated in FIG. 3, discussed below). The lower electrical connection 120 may be a wire, conductive trace (e.g., copper) or foil electrically connecting a conductor of the piezoelectric transducer 105 (e.g., the lower conductor 210 of the piezoelectric transducer 105 illustrated in FIG. 2, discussed below) to a conductor of the chromic device 110 (e.g., the lower conductor 310 of the chromic device 110 illustrated in FIG. 3, discussed below). The upper electrical connection 115 and the lower electrical connection 120 may be attached to the respective conductors of the piezoelectric transducer 105 and the chromic device 110 by any suitable conventional means such as solder, conductive adhesive, surface mount technology (SMT), etc.

In the embodiment illustrated in FIG. 1, the piezoelectric transducer 105 and the chromic device 110 are separately mounted atop a substrate 125. In other embodiments of the present invention, such as the embodiments shown in FIGS. 7 and 10, the chromic device may be mounted atop the piezoelectric transducer.

The substrate 125 may be any suitable substrate material. The substrate 125, which is typically plastic, may be rigid, semi-rigid or flexible. For example, the substrate 125 may be a resin. Examples of the resin are a thermoplastic resin, a thermosetting resin, a photo-curing resin, and the like. Concrete examples are polyolefin resins such as polyethylene and polypropylene, styrene resins such as polystyrene, AS resin, and ABS resin, polyester resins such as polyethylene terephthalate (PET) and polybutylene terephthalate, fluorine resins such as polyethylene tetrafluoride resin, chlorine resins such as vinyl chloride, acrylic resin, polyamide resin such as nylon, polycarbonate resin, polyacetal resin, urea resin, epoxy resin, phenol resin, polyimide resin, and the like. One of them can be used singly or as a combination of two or more. In a particularly noteworthy example, the substrate 125 may be a PET substrate that is the backing for a pressure sensitive adhesive tape by which the impact sensor 100 is adhered to a product to be monitored or packaging (e.g., on one or more sides of the shipping container 500 illustrated in FIG. 5, discussed below, or as a corner wrap device on the shipping container 600 illustrated in FIG. 6, discussed below).

Figure 4:
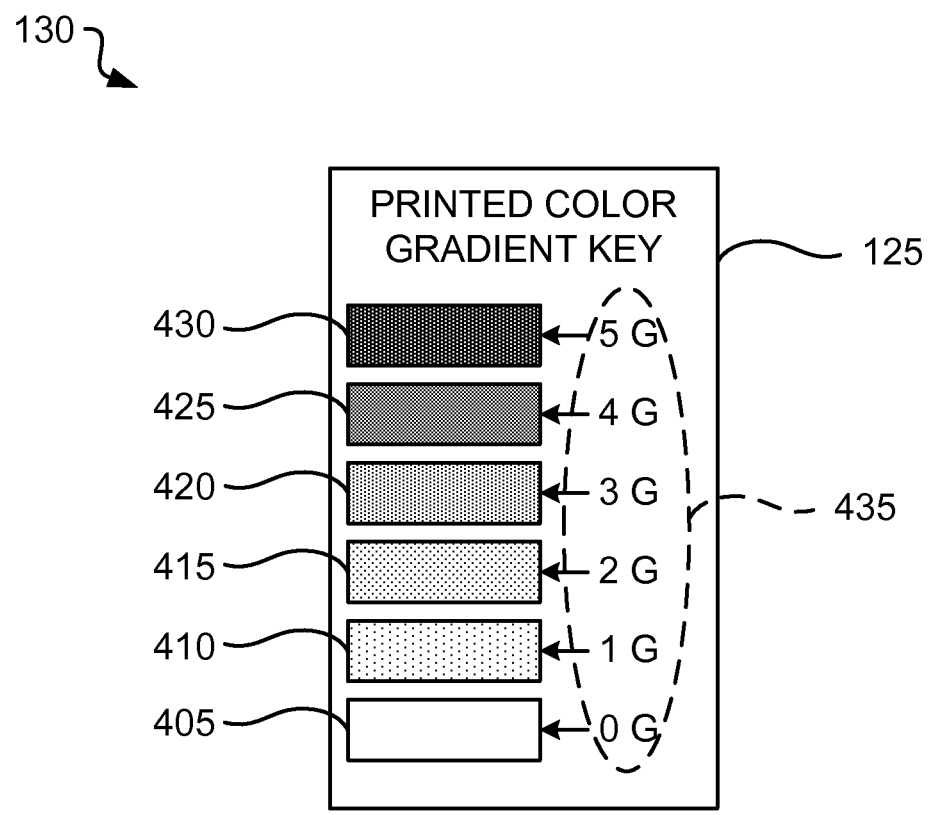
FIG. 4 is a block diagram illustrating an exemplary embodiment of the printed color gradient key of the piezoelectric chromic impact sensor in FIG. 1.

Also, in the embodiment illustrated in FIG. 1, a printed color gradient key 130 is provided on the substrate 125, preferably in a location near the chromic device 110 to facilitate color comparison. Preferably, the printed color gradient key 130 includes a photographic representation of two or more of the light transmission states of the chromic device 110, as well as indicia setting forth an impact force corresponding to each of the two or more light transmission states. An exemplary embodiment of the printed color gradient key 130 is illustrated in FIG. 4.

The printed color gradient key 130 may be a label that is affixed to the substrate 125 by, for example, a pressure sensitive adhesive. Alternatively, the printed color gradient key 130 may be directly printed onto the substrate 125. In another alternative, the printed color gradient key 130 may be omitted from the substrate 125 and instead held in the hand of the user.

FIG. 2 is a block diagram illustrating an exemplary embodiment of the piezoelectric transducer 105 of the piezoelectric chromic impact sensor 100 in FIG. 1.

In general, the construction/materials of piezoelectric transducers suitable for use as the piezoelectric transducer 105 are well known in the art. For example, the construction/materials of suitable piezoelectric transducers are disclosed in U.S. Patent Application Publication No. 2003/0169574 A1, which is incorporated herein by reference in its entirety.

In the embodiment illustrated in FIG. 2, the piezoelectric transducer 105 includes the substrate 125, a conductor 210, a piezoelectric material 215, and a conductor 220. The conductor 210 may be a thin metal conducting foil electrode (e.g., copper or other suitable metal conductor) deposited on or adhered to the substrate 125 using any suitable technique known to those skilled in the art. The piezoelectric material 215 may be any suitable piezoelectric material deposited on (or otherwise in conductive contact with) the conductor 210 using any suitable technique known to those skilled in the art. For example, the piezoelectric material 215 may be polyvinylidene fluoride (PVDF) cast as a thin film on the conductor 210. The thickness of the piezoelectric material 215 is preferably 25-500 μm, most preferably 50-200 μm. The conductor 220 may be a thin metal conducting foil electrode (e.g., copper or other suitable metal conductor) deposited on (or otherwise in conductive contact with) the piezoelectric material 215 using any suitable technique known to those skilled in the art.

The piezoelectric material 215 of the piezoelectric transducer 105 is not particularly limited and can be suitably selected. The materials may be inorganic materials or organic materials. The materials may be used singly or in combination of two or more.

The inorganic materials are not particularly limited and any inorganic materials for the piezoelectric material 215 known in the art can be suitably selected. Examples of the inorganic materials are $PbZrTiO_3$ (lead zirconate titanate), $PbLaZrTiO_3$ (lead lanthanum zirconate titanate), $SrBi_2Ta_2O_9$ (strontium bismuth tantalic acid), $(Bi, La)_4Ta_3O_{12}$ (bismuth lanthanium tantalic acid), $Bi_4Ti_3O_{12}$ (bismuth titanate), and the like.

The organic materials are not particularly limited and any organic materials for the piezoelectric material 215 known in the art can be suitably selected. Examples of the organic materials are PVDF(polyvinylidene fluoride), polyethylene trifluoride, polyethylene tetrafluoride, P(VDF-TrFE) (a copolymer of vinylidene fluoride and ethylene trifluoride), P(VDF-TetraFE) (a copolymer of vinylidene fluoride and ethylene tetrafluoride), polyvinyl alcohol, polyethylene terephthalate, polyoxymethylene, polyethylene, polypropylene, polyphenyl sulfide, crystalline polystyrene, crystalline polymethyl methacrylate, crystalline polycarbonate, and the like.

FIG. 3 is a block diagram illustrating an exemplary embodiment of the chromic device 110 of the piezoelectric chromic impact sensor 100 in FIG. 1.

In general, the construction/materials of electrochromic display devices (ECDs) suitable for use as the chromic device 110 are well known in the art. For example, the construction/materials of suitable ECDs are disclosed in U.S. Patent Application Publication No. 2003/0169574 A1.

In the embodiment illustrated in FIG. 3, the chromic device 110 is an electrochromic device that includes the substrate 125, a conductor 310, an electrochromic material 315, and a transparent conductor 320. In other embodiments, a thermochromic material (e.g., 905 in FIG. 9) may be used in lieu of the electrochromic material 315. The conductor 310 may be a thin metal conducting foil electrode (e.g., copper or other suitable metal conductor) deposited on or adhered to the substrate 125 using any suitable technique known to those skilled in the art. The electrochromic material 315 may be any suitable electrochromic material deposited on (or otherwise in conductive contact with) the conductor 310 using any suitable technique known to those skilled in the art. For example, the electrochromic material 315 may be a viologen (e.g., ethyl viologen (EV) (1,1'-diethyl-4,4' dipyridilium dichloride) or methyl viologen (MV) (1,1'-dimethyl-4,4' dipyridilium dichloride)) incorporated into a suitable polymer (e.g., poly(methyl methacrylate) (PMMA)) that is cast as thin film on the conductor 310. The thickness of the electrochromic material 315 is preferably 25-500 μm, most preferably 50-200 μm. The transparent conductor 320 may be an indium doped tin oxide (ITO) electrode deposited on (or otherwise in conductive contact with) the electrochromic material 315 using any suitable technique known to those skilled in the art. The ITO electrode may be in the form of a transparent ITO/plastic substrate (e.g., a transparent PET substrate coated with a transparent conductor layer of ITO) or ITO glass. The ITO electrode is transparent so that the user can readily discern the color change of the electrochromic (or thermochromic) thin film underneath.

The electrochromic material 315 may be deposited on the conductor 310 in a patterned manner to form a word, phrase or symbol that conveys additional information to the user. For example, the electrochromic material 315 may be deposited on the conductor 310 by way of screen printing. In addition, multiple electrochromic materials, each exhibiting different color properties, may be deposited on multiple areas of the conductor 310. For example, a transparent-to-blue transition of a first electrochromic material may occur in an area that creates an image that reads "damage possible" when the impact sensor is exposed to a shock value within a first range of shock values (a relatively low range), whereas a transparent-to-red transition of a second electrochromic material may occur in a different area that creates an image that reads "damage likely" when the impact sensor is exposed to a shock value within a second range of shock values (a relatively high range).

The electrochromic material 315 of the chromic device 110 is not particularly limited and can be suitably selected. An all solid-state electochromic display device (ECD) is typically preferable.

Favorable examples of the all solid-state electrochromic display device are a self-doped conductive polymer, a π-conjugated polymer, and the like. Of these, the polymer may be used singly or in combination of two or more.

The self-doped conductive polymer is not particularly limited and can be suitably selected according to the intended purpose. Preferable examples are poly(isothianaphthene sulfonic acid), poly(thiophene alkane sulfonic acid), poly(pyrrole alkane sulfonic acid), poly(aniline sulfonic acid), poly(carbazole-N-alkane sulfonic acid), poly(phenylene/oxyalkane sulfonic acid), poly(thiophene alkane carboxylic acid), poly(isothianaphthene-5-sulfonic acid-co-isoanaphthene), poly(thiophene-3-alkane sulfonic acid-co-thiophene), poly(pyrrole-3-alkane sulfonic acid-co-pyrrole), poly(aniline sulfonic acid-co-aniline), poly(carbazole-N-alkane sulfonic acid-co-carbazole), poly(phenylene-oxyalkane sulfonic acid-co-phenylene), and poly(thiophene-3-alkane carboxylic acid-co-thiophene). In addition to the above, preferable examples of the self-doped conductive polymer may also include N-vinylcarbon acid amide polymers.

The π-conjugated polymer is not particularly limited and can be suitably selected according to the intended purpose. Preferably examples are polyaniline, poly(o-phenylendiamine), poly(metanilic acid), poly(thiophene-2,5-diyl), poly (3-methylthiophene), poly(3,4-dimethylthiophene), poly(1, 3-bis-2-thienyl benzene), polyisothianaphthene, polypyrrole, poly(2,5-pyridinediyl), poly(6-hexyl-2,5-pyridinediyl), poly (1,4-isoquinoline diyl), poly(2,5-pyrimidinediyl), poly(5,8-quinoxaline diyl), polyvinylquaterthiophene, poly(2,6-quinolinediyl), poly(2-methyl-1,4-anthraquinonediyl), and the like.

The relations among oxidation, neutral, and reduction states in the π-conjugated polymers and colors are described as follows. In parenthesis, coloring in each of the oxidation, neutral, and reduction states is shown. (1) polyaniline (oxidation state: bluish green, neutral state: light yellow, reduction state: none), (2) poly(o-phenylenediamine) (oxidation state: red, neutral state: no color, reduction state: none), (3) poly(metanilic acid) (oxidation state: blue, neutral state: no color, reduction state: none), (4) poly(thiophene-2,5-diyl) (oxidation state: blue, neutral state: red, reduction state: none), (5) poly(3-methylthiophene) (oxidation state: deep blue, neutral state: red, reduction state: none), (6) poly(3,4-dimethylthiophene) (oxidation state: deep blue, neutral state: light blue, reduction state: none), (7) poly(1,3-bis-2-thienyl benzene) (oxidation state: green, neutral state: yellow, reduction state: none), (8) polyisothianaphthene (oxidation state: no color, neutral state: yellow, reduction state: none), (9) polypyrrole (oxidation state: violet, neutral state: yellow, reduction state: none), (10) poly(2,5-pyridinediyl) (oxidation state: none, neutral state: yellow, reduction state: reddish purple), (11) poly(6-hexyl-2,5-pyridinediyl) (oxidation state: none, neutral state: yellow, reduction state: dark orange), (12) poly(1,4-isoquinoline diyl) (oxidation state: none, neutral state: light yellow, reduction state: reddish purple), (13) poly (2,5-pyrimidinediyl) (oxidation state: none, neutral state: orange, reduction state: deep purple), (14) poly(5,8-quinoxaline diyl) (oxidation state: none, neutral state: yellow, reduction state: reddish brown), (15) polyvinylquaterthiophene (oxidation state: green, neutral state: yellow, reduction state: none), (16) poly(2,6-quinoline diyl) (oxidation state: none, neutral state; yellow, reduction state: dark blue), and (17) poly(2-methyl-1,4-anthraquinonediyl) (oxidation state: none, neutral state: yellow, reduction state: red).

FIG. 4 is a block diagram illustrating an exemplary embodiment of the printed color gradient key 130 of the piezoelectric chromic impact sensor 100 in FIG. 1. In the exemplary embodiment illustrated in FIG. 4, the printed color gradient key 130 is printed directly on the substrate 125, preferably in a location near the chromic device to facilitate color comparison. The printed color gradient key 130 includes a photographic representation of two or more of the light transmission states 405, 410, 415, 420, 425, and 430 of the chromic device 110, as well as indicia 435 setting forth an impact force (e.g., 0 G, 1 G, 2 G, 3 G, 4 G, and 5 G) corresponding to each of the two or more light transmission states. In the exemplary embodiment illustrated in FIG. 4, the number of light transmission states represented and the particular impact forces that correspond therewith are provided for purposes of illustration, not limitation.

Figure 5:
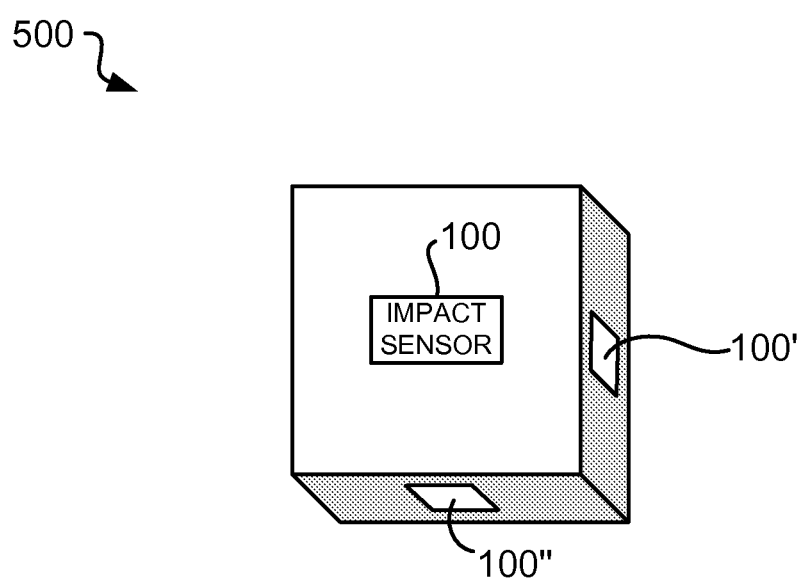
FIG. 5 is a block diagram illustrating a shipping container on which is mounted the piezoelectric chromic impact sensor in FIG. 1.

FIG. 5 is a block diagram illustrating a shipping container 500 on which is mounted the piezoelectric chromic impact sensor 100 in FIG. 1. Preferably, the substrate of the impact sensor 100 is the backing for a pressure sensitive adhesive (PSA) tape by which the impact sensor 100 is adhered to one or more sides of the shipping container 500. Because the piezoelectric transducer of the impact sensor 100 is directional, it is preferable to utilize one of the impact sensors 100 on each axis of the shipping container 500. Hence, in the embodiment shown in FIG. 5, each of three impact sensors 100, 100' and 100" is respectively attached to one of three orthogonal walls of the shipping container 500.

Figure 6:
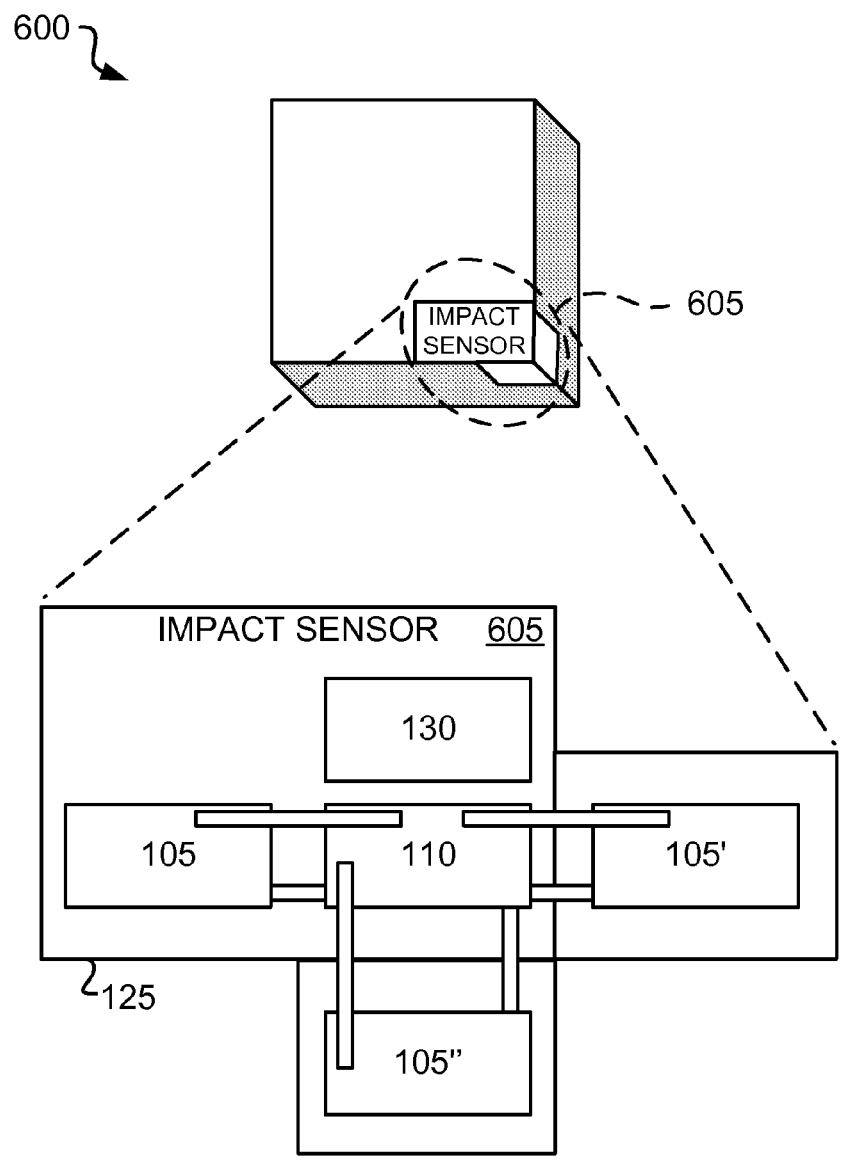
FIG. 6 is a block diagram illustrating a shipping container on which is mounted an exemplary multi-axis embodiment of the piezoelectric chromic impact sensor in accordance with the present invention.

FIG. 6 is a block diagram illustrating a shipping container 600 on which is mounted an exemplary multi-axis embodiment of a piezoelectric chromic impact sensor 605 in accordance with the present invention. The multi-axis impact sensor 605 is a corner wrap device that is folded over and attached to three orthogonal walls of the shipping container 600. For example, the multi-axis impact sensor 605 may simply include three separate impact sensors (each corresponding to the piezoelectric chromic impact sensor 100 in FIG. 1) provided on a common flexible substrate. Because the piezoelectric transducer of the impact sensor 100 is directional, it is preferable to utilize one of the impact sensors 100 on each axis of the shipping container 600. Accordingly, each of the three separate impact sensors of the multi-axis impact sensor 605 is respectively positioned on the common flexible substrate for attachment to a respective one of the three orthogonal walls of the shipping container 600. Preferably, the substrate of the multi-axis impact sensor 605 is the backing for a pressure sensitive adhesive (PSA) tape by which the multi-axis impact sensor 605 is adhered to the three orthogonal walls of the shipping container 600. Alternatively, as illustrated in FIG. 6, the multi-axis impact sensor 605 may include three separate piezoelectric transducers 105, 105', and 105" that share a single chromic device 110.

Figure 7:
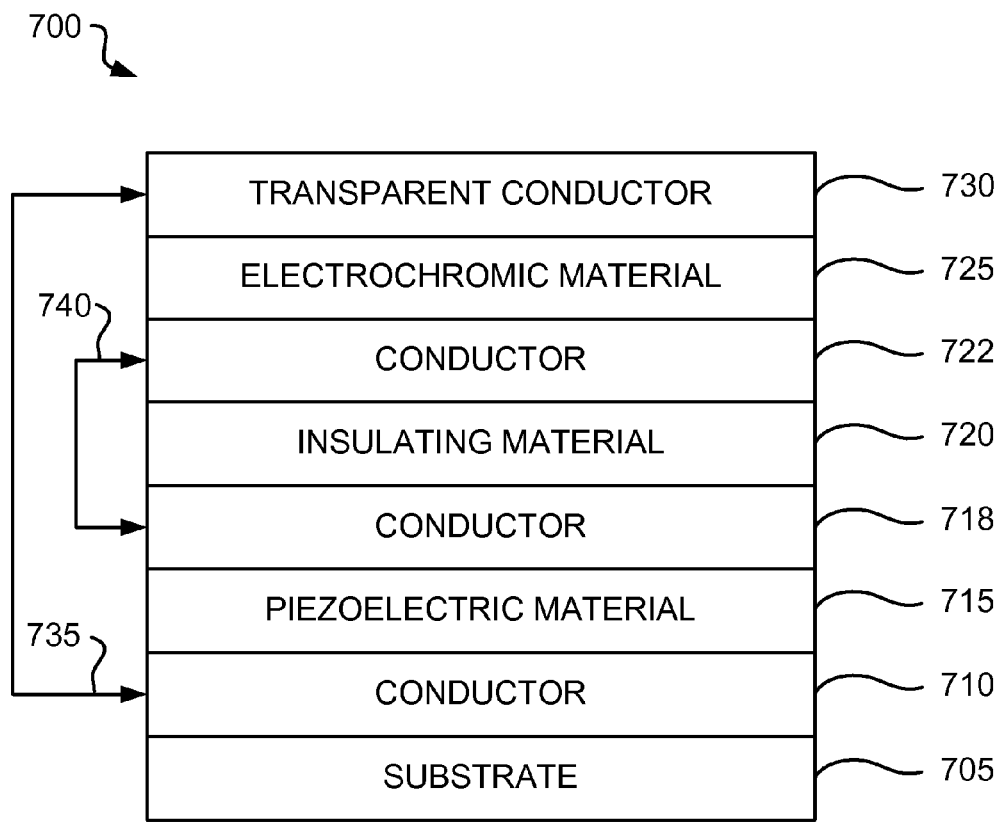
FIG. 7 is a block diagram illustrating another embodiment of a piezoelectric chromic impact sensor in accordance with the present invention, in which an electrochromic device is laminated atop a piezoelectric transducer.

FIG. 7 is a block diagram illustrating another embodiment of a piezoelectric chromic impact sensor 700 in accordance with the present invention, in which an electrochromic device is laminated atop a piezoelectric transducer. In the embodiment illustrated in FIG. 7, the impact sensor 700 includes a substrate 705, a conductor 710, a piezoelectric material 715, a conductor 718, an insulating material 720, a conductor 722, an electrochromic material 725, a transparent conductor 730, an electrical connection 735, and an electrical connection 740.

In the embodiment illustrated in FIG. 7, an electrochromic device is laminated atop a piezoelectric transducer. In other embodiments, a thermochromic device may be laminated atop a piezoelectric transducer. That is, a thermochromic material (e.g., 905 in FIG. 9) may be used in lieu of the electrochromic material 725.

The piezoelectric transducer of the impact sensor 700 includes the conductor 710, the piezoelectric material 715 and the conductor 718. The electrochromic device of the impact sensor 700 includes the conductor 722, the electrochromic material 725 and the transparent conductor 730. In the impact sensor 700, the piezoelectric transducer and the electrochromic device are separated by the insulating material 720 (e.g., an insulating film or a PSA). The conductor 710 (at the bottom of the piezoelectric transducer) and the transparent conductor 730 (at the top of the electrochromic device) are electrically connected by the electrical connection 735. Similarly, the conductor 718 (at the top of the piezoelectric transducer) and the conductor 722 (at the bottom of the electrochromic device) are electrically connected by the electrical connection 740.

The substrate 705 of the impact sensor 700 generally corresponds to the substrate 125 in the impact sensor 100. The conductor 710 may be a thin metal conducting foil electrode (e.g., copper or other suitable metal conductor) deposited on or adhered to the substrate 705 using any suitable technique known to those skilled in the art. The piezoelectric material 715 may be any suitable piezoelectric material deposited on (or otherwise in conductive contact with) the conductor 710 using any suitable technique known to those skilled in the art. For example, the piezoelectric material 715 may be polyvinylidene fluoride (PVDF) cast as a thin film on the conductor 710. The thickness of the piezoelectric material 715 is preferably 25-500 µm, most preferably 50-200 µm. The conductor 718 may be a thin metal conducting foil electrode (e.g., copper or other suitable metal conductor) deposited on (or otherwise in conductive contact with) the piezoelectric material 715 using any suitable technique known to those skilled in the art.

The insulating material 720 may be any suitable electrically insulating material (e.g., an insulating film of a resin, for example, deposited on the conductor 718 using any suitable technique known to those skilled in the art, or an insulating backing of a PSA tape by which the electrochromic device may be adhered to the piezoelectric transducer). The conductor 722 may be a thin metal conducting foil electrode (e.g., copper or other suitable metal conductor) deposited on or adhered to the insulating material 720 using any suitable technique known to those skilled in the art.

The electrochromic material 725 may be any suitable electrochromic material deposited on (or otherwise in conductive contact with) the conductor 722 using any suitable technique known to those skilled in the art. For example, the electrochromic material 725 may be a viologen (e.g., ethyl viologen (EV) (1,1'-diethyl-4,4' dipyridilium dichloride) or methyl viologen (MV) (1,1'-dimethyl-4,4' dipyridilium dichloride)) incorporated into a suitable polymer (e.g., poly(methyl methacrylate) (PMMA)) and cast as thin film on the conductor 722. The thickness of the electrochromic material 725 is preferably 25-500 µm, most preferably 50-200 µm.

The electrochromic material 725 may be deposited on the conductor 722 in a patterned manner to form a word, phrase or symbol that conveys additional information to the user. For example, the electrochromic material 725 may be deposited on the conductor 722 by way of screen printing. In addition, multiple electrochromic materials, each exhibiting different color properties, may be deposited on multiple areas of the conductor 722. For example, a transparent-to-blue transition of a first electrochromic material may occur in an area that creates an image that reads "damage possible" when the impact sensor is exposed to a shock value within a first range of shock values (a relatively low range), whereas a transparent-to-red transition of a second electrochromic material may occur in a different area that creates an image that reads "damage likely" when the impact sensor is exposed to a shock value within a second range of shock values (a relatively high range).

The transparent conductor 730 may be an indium doped tin oxide (ITO) electrode deposited on (or otherwise in conductive contact with) the electrochromic material 725 using any suitable technique known to those skilled in the art. The ITO electrode may be in the form of a transparent ITO/plastic substrate (e.g., a transparent PET substrate coated with a transparent conductor layer of ITO) or ITO glass. The ITO electrode is transparent so that the user can readily discern the color change of the electrochromic (or thermochromic) thin film underneath.

The electrical connection 735 may be a wire, conductive trace (e.g., copper) or foil electrically connecting the conductor 710 (at the bottom of the piezoelectric transducer) to the transparent conductor 730 (at the top of the electrochromic device). Similarly, the electrical connection 740 may be a wire, conductive trace (e.g., copper) or foil electrically connecting the conductor 718 (at the top of the piezoelectric transducer) to the conductor 722 (at the bottom of the electrochromic device). The electrical connections 735 and 740 may be attached to the respective conductors of the piezoelectric transducer and the chromic device by any suitable conventional means such as solder, conductive adhesive, surface mount technology (SMT), etc.

Figure 8:
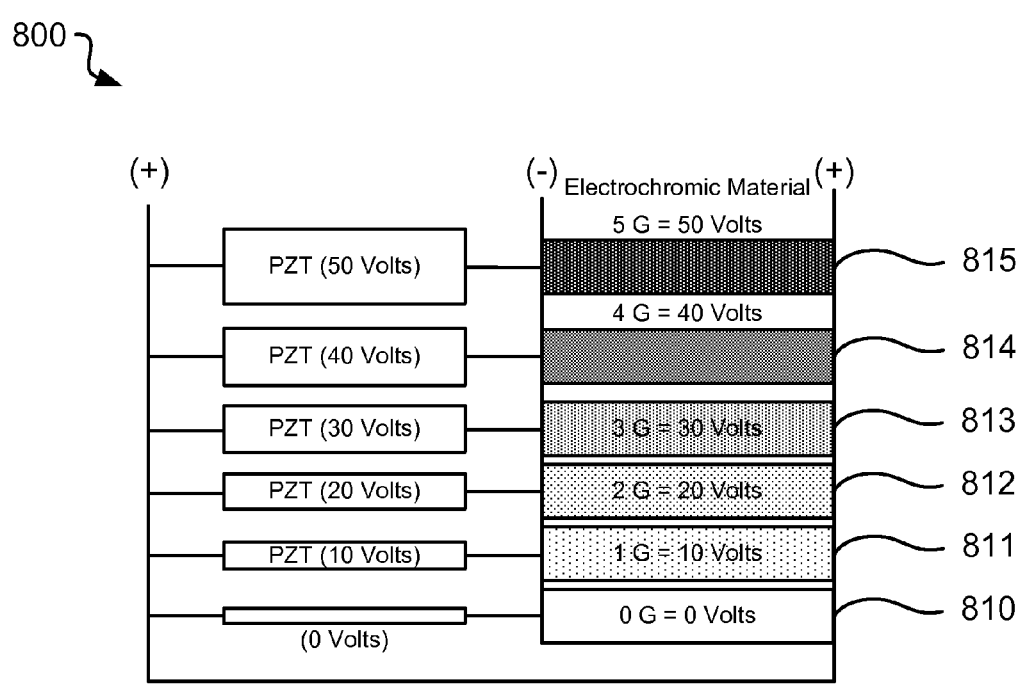
FIG. 8 is a block diagram illustrating operation of an exemplary embodiment of a piezoelectric chromic impact sensor employing an electrochromic device in accordance with the present invention.

FIG. 8 is a block diagram illustrating operation of an exemplary embodiment of a piezoelectric chromic impact sensor 800 employing an electrochromic device in accordance with the present invention. In the embodiment illustrated in FIG. 8, multiple piezoelectric transducers (PZTs) are designed to respond to specific G values or impact forces by generating a range of particular voltages (0 Volts-50 Volts). One skilled in the art will appreciate that while five PZTs connected in a parallel configuration are shown in FIG. 8, any number and any configuration of PZTs may be used to generate electric power having any range of particular voltages in response to specific G values or impact forces.

The electrochromic material of the impact sensor 800 responds to a particular voltage (within the range of particular voltages generated by the PZTs in response to specific G values or impact forces) by displaying a particular light transmission intensity (within a color gradient of light transmission states 810, 811, 812, 813, 814 and 815 from a transparent state 810 to a dark state 815). Although six light transmission states 810-815 are shown in FIG. 8 for explanation purposes, the electrochromic material of the impact sensor 800 will display only one light transmission state, i.e., the light transmission state corresponding to the (maximum) particular voltage generated by the PZTs in response to exposure to a specific G value or impact force. For instance, an impact force of 3 Gs causes the PZTs to generate 30 Volts which in turn causes the electrochromic material to display the light transmission state 813. In another case, an impact force of 4 Gs causes the PZTs to generate 40 Volts which in turn causes the electrochromic material to display the light transmission state 814. In either case, the user would quantify the impact force by observing the light transmission state displayed by the electrochromic material and comparing it to the light transmission states on the printed color gradient key.

Figure 9:
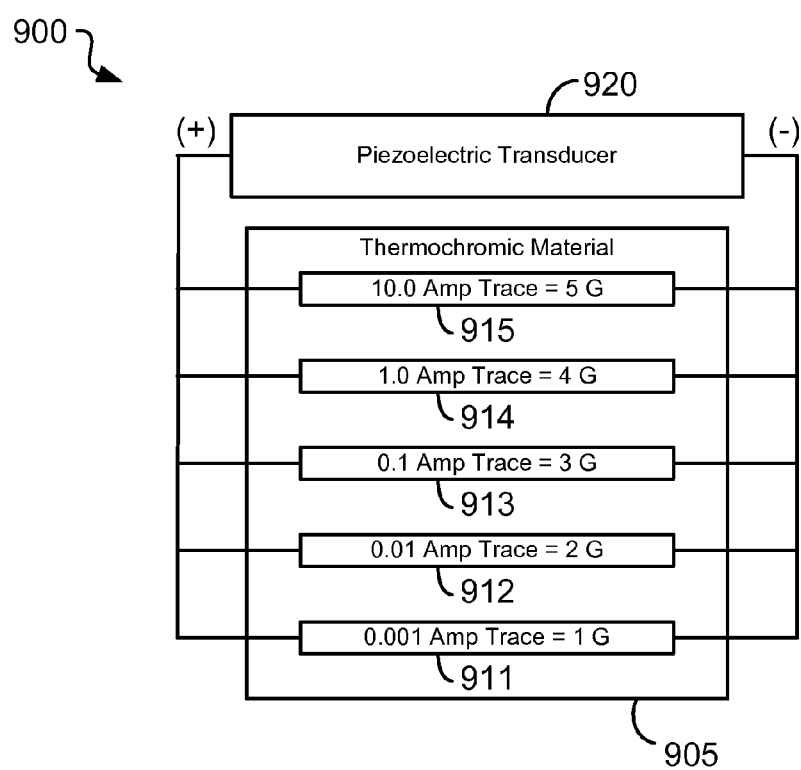
FIG. 9 is a block diagram illustrating operation of an exemplary embodiment of a piezoelectric chromic impact sensor employing a thermochromic device in accordance with the present invention.

FIG. 9 is a block diagram illustrating operation of an exemplary embodiment of a piezoelectric chromic impact sensor 900 employing a thermochromic device in accordance with the present invention. The thermochromic device of the impact sensor 900 includes a thermochromic material 905 and a set of resistors 911, 912, 913, 914 and 915 each correlated to an impact force within a range of impact forces (1 G-5 G). A piezoelectric transducer 920 is coupled in series to the set of resistors.

In general, a plethora of thermochromic materials suitable for use in the thermochromic device are well known in the art. For example, numerous suitable thermochromic materials are disclosed in U.S. Pat. No. 4,138,357, which is incorporated herein by reference in its entirety.

Several liquid crystal materials such as cholesteryl nonanoate or cyanobiphenyls can be used directly, or leuco dyes can be easily incorporated into any easily castable polymer (such as poly(methyl methacrylate) PMMA, for example) to form a thin film thermochromic material.

In the embodiment illustrated in FIG. 9, the resistors 911, 912, 913, 914 and 915 are in the form of resistive traces (0.001 Amp, 0.01 Amp, 0.1 Amp, 1.0 Amp, and 10 Amp) in thermal contact with the thermochromic material 905. When the piezoelectric transducer 920 is subjected to an impact force, one or more resistive traces correlated to the impact force heats the thermochromic material 905 to a color state transition. For instance, an impact force of 3 Gs causes 0.1 Amps to flow through the resistor 913 from the piezoelectric transducer 920. This current flow in turn heats a portion of the thermochromic material 905 that is in thermal contact with the resistor 913. This heating in turn changes the color state of the thermochromic material 905 in the vicinity of the resistor 913. Thus, the thermochromic material 905 is heated unevenly. The user would quantify the impact force by observing the position at which the color state transitions on the thermochromic material 905. Preferably, markings adjacent to the thermochromic material 905 are provided on the impact sensor 900 to correlate positions at which the color state transitions and impact forces.

One skilled in the art will appreciate that while five resistive traces connected in a parallel configuration are shown in FIG. 9, any number and any configuration of resistive traces (e.g., a thin layer resistor in the shape of a triangle) or other heat producing elements may be correlated to any range of impact forces.

The thermochromic material 905 may be deposited in a patterned manner to form a word, phrase or symbol that conveys additional information to the user. For example, the electrochromic material 905 may be deposited by way of screen printing. In addition, multiple thermochromic materials, each exhibiting different color properties, may be deposited in multiple areas. For example, a transparent-to-blue transition of a first thermochromic material may occur in an area that creates an image that reads "damage possible" when the impact sensor is exposed to a shock value within a first range of shock values (a relatively low range), whereas a transparent-to-red transition of a second thermochromic material may occur in a different area that creates an image that reads "damage likely" when the impact sensor is exposed to a shock value within a second range of shock values (a relatively high range).

Figure 10:
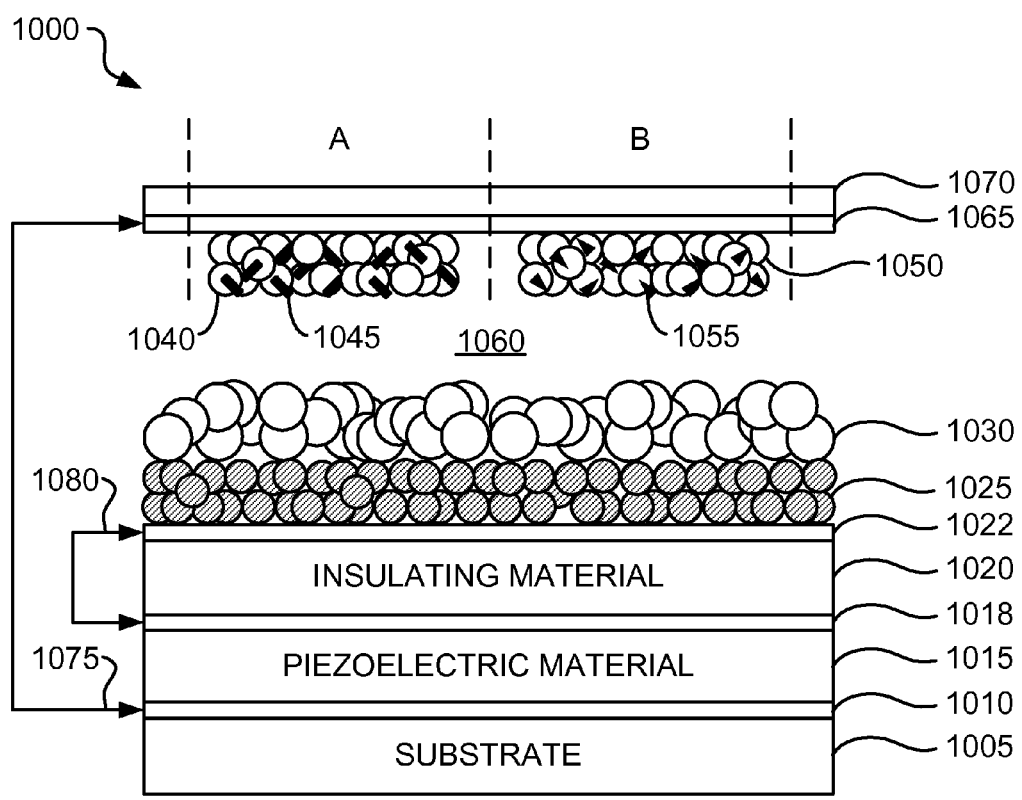
FIG. 10 is a block diagram illustrating yet another embodiment of a piezoelectric chromic impact sensor in accordance with the present invention, in which an electrochromic device having portions that exhibit different color properties is laminated atop a piezoelectric transducer.

FIG. 10 is a block diagram illustrating yet another embodiment of a piezoelectric chromic impact sensor 1000 in accordance with the present invention, in which an electrochromic device having portions that exhibit different color properties is laminated atop a piezoelectric transducer. In the embodiment illustrated in FIG. 10, the impact sensor 1000 includes a substrate 1005, a conductor 1010, a piezoelectric material 1015, a conductor 1018, an insulating material 1020, a conductor 1022, a nanostructured film 1025, an ion-permeable white reflective layer 1030, a nanostructured film 1040 with adsorbed chromphoric redox material 1045, a nanostructured film 1050 with adsorbed chromphoric redox material 1055, an electrolyte 1060, a transparent conductor 1065, a transparent substrate 1070, an electrical connection 1075, and an electrical connection 1080.

The piezoelectric transducer of the impact sensor 1000 includes the conductor 1010, the piezoelectric material 1015 and the conductor 1018.

The electrochromic device of the impact sensor 1000 includes the conductor 1022, the nanostructured film 1025, the ion-permeable white reflective layer 1030, the nanostructured film 1040 with adsorbed chromphoric redox material 1045, the nanostructured film 1050 with adsorbed chromophoric redox material 1055, the electrolyte 1060, and the transparent conductor 1065. As used herein, the phrase "nanostructured film" is a nanoporous-nanocrystalline semi-conducting film fabricated as well known to those skilled in the art.

The electrochromic device utilized in the impact sensor 1000 is a modified version of an electrochromic display device disclosed in U.S. Pat. No. 7,403,319 B2, which is incorporated herein by reference in its entirety. The examples described therein utilize nanostructured films with adsorbed chromophoric redox material. Electrochromic display devices that utilize nanostructured films with adsorbed chromophoric redox materials are described in greater detail in U.S. Pat. Nos. 6,301,038 and 6,870,657, both of which are incorporated by reference herein in their entireties.

In the impact sensor 1000, the piezoelectric transducer and the electrochromic device are separated by the insulating material 1020 (e.g., an insulating film or a PSA). The conductor 1010 (at the bottom of the piezoelectric transducer) and the transparent conductor 1065 (at the top of the electrochromic device) are electrically connected by the electrical connection 1075. Similarly, the conductor 1018 (at the top of the piezoelectric transducer) and the conductor 1022 (at the bottom of the electrochromic device) are electrically connected by the electrical connection 1080.

The substrate 1005 of the impact sensor 1000 generally corresponds to the substrate 125 in the impact sensor 100. The conductor 1010 may be a thin metal conducting foil electrode (e.g., copper or other suitable metal conductor) deposited on or adhered to the substrate 1005 using any suitable technique known to those skilled in the art. The piezoelectric material 1015 may be any suitable piezoelectric material deposited on (or otherwise in conductive contact with) the conductor 1010 using any suitable technique known to those skilled in the art. For example, the piezoelectric material 1015 may be polyvinylidene fluoride (PVDF) cast as a thin film on the conductor 1010. The thickness of the piezoelectric material 1015 is preferably 25-500 µm, most preferably 50-200 µm. The conductor 1018 may be a thin metal conducting foil electrode (e.g., copper or other suitable metal conductor) deposited on (or otherwise in conductive contact with) the piezoelectric material 1015 using any suitable technique known to those skilled in the art.

The insulating material 1020 may be any suitable electrically insulating material (e.g., an insulating film of a resin, for example, deposited on the conductor 1018 using any suitable technique known to those skilled in the art, or an insulating backing of a PSA tape by which the electrochromic device may be adhered to the piezoelectric transducer). The conductor 1022 may be a thin metal conducting foil electrode (e.g., copper or other suitable metal conductor) deposited on or adhered to the insulating material 1020 using any suitable technique known to those skilled in the art.

In the impact sensor 1000, the electrochromic device utilized is based on two or more nanostructured films each with a different adsorbed chromophoric redox material. These chromophoric redox materials exhibit different color properties. For example, two adsorbed electrochromophores that respectively appear blue and red in a reduced state and transparent in an oxidized state may be used. The transparent-to-blue transition of one adsorbed electrochromophore may occur for a range of potentials generated by the piezoelectric transducer when exposed to a first range of shock values (e.g., a relatively low range), and the transparent-to-red transition of the other adsorbed electrochromophore may occur for a range of potentials generated by the piezoelectric transducer when exposed to a second range of shock values (a relatively high range).

In addition to using a printed color gradient key to quantify the impact force within each of the two ranges of shock values, the nanostructured films with adsorbed chromophoric redox material may each convey additional information to the user. These nanostructured films may be deposited in a patterned manner to form a word, phrase or symbol that conveys additional information to the user. For example, the transparent-to-blue transition may occur in an area of the impact sensor that creates an image that reads "damage possible" when the impact sensor is exposed to a shock value within the first range of shock values (the relatively low range), whereas the transparent-to-red transition may occur in a different area of the impact sensor that creates an image that reads "damage likely" when the impact sensor is exposed to a shock value within the second range of shock values (the relatively high range).

In the embodiment illustrated in FIG. 10, a nanostructured film 1040 with adsorbed chromophoric redox material 1045 (area A) and a nanostructured film 1050 with adsorbed chromophoric redox material 1055 (area B), each reside on a substantially transparent conductor 1065. The transparent conductor 1065, in turn, resides on a transparent substrate 1070. The nanostructured films 1040 and 1050 each include a metal oxide. A nanostructured film 1025, also including a metal oxide, is located on the conductor 1022. Subjecting the piezoelectric transducer to an impact force within the first range of shock values (or within the second range of shock values) generates electric power that creates an image (sensor reading) by modulating the redox state of the chromophoric redox material 1045 (or the chromophoric redox material 1055), and, thus, the light that passes through the area of the nanostructured film 1040 (or the nanostructured film 1050). In the preferred embodiments, the nanostructured films 1040 and 1050 include titanium dioxide ($TiO_2$) and the chromophoric redox material is a viologen. Ethyl viologen transitions from transparent to blue, whereas octyl viologen transitions from transparent to crimson. Also, in the preferred embodiments, the nanostructured film 1025 is $SnO_2$:Sb (ATO), $In_2O_3$:Sn (ITO) or $SnO_2$:F (FTO).

Layers 1040, 1045, 1050, 1055 and 1065 may define a cathode and layers 1022 and 1025 an anode of the electrochromic device, or vice versa. Control is imparted by applying a voltage or current (via the electric power generated by the piezoelectric transducer) through the electrochromic device, and electrical connection is provided by a suitable electrolyte 1060 provided between the cathode layers and the anode layers. The voltage or current applied through the electrochromic device changes the redox state, and hence the color, of the adsorbed chromophoric materials 1045 and 1055. Light is, thus, absorbed or allowed to pass. When light is absorbed, the affected area (area A and/or area B) may appear dark. In contrast, light that passes may be reflected off an ion-permeable white reflective layer 1030.

A nanostructured film 1025 is deposited, preferably by way of screen printing with an organic binder, on the conductor 1022. The nanostructured film 1025 is typically a doped metal oxide, such as antimony tin oxide (ATO). Optionally, a redox reaction promoter compound is adsorbed on the surface of the nanostructured film 1025. An ion-permeable reflective layer 1030, typically white titanium dioxide ($TiO_2$), is optionally deposited, preferably by way of screen printing with an organic binder followed by sintering, on the nanostructured film 1025.

The transparent conductor 1065 may be an indium doped tin oxide (ITO) electrode deposited on or adhered to the transparent substrate 1070 using any suitable technique known to those skilled in the art. The ITO electrode may be in the form of a transparent ITO/plastic substrate (e.g., a transparent PET substrate coated with a transparent conductor layer of ITO) or ITO glass. The nanostructured film 1040 having chromophoric redox material 1045 adsorbed thereto is deposited on the transparent conductor 1065, preferably by way of a self-assembled mono-layer deposition from solution as well known to those skilled in the art. Likewise, the nanostructured film 1050 having the chromophoric redox material 1055 adsorbed thereto is deposited on the transparent conductor 1065, preferably by way of a self-assembled monolayer deposition from solution as well known to those skilled in the art. The ITO electrode is transparent so that the user can readily discern the color change of the nanostructured films 1040 and 1050 underneath.

The electrical connection 1075 may be a wire, conductive trace (e.g., copper) or foil electrically connecting the conductor 1010 (at the bottom of the piezoelectric transducer) to the transparent conductor 1065 (at the top of the electrochromic device). Similarly, the electrical connection 1080 may be a wire, conductive trace (e.g., copper) or foil electrically connecting the conductor 1018 (at the top of the piezoelectric transducer) to the conductor 1022 (at the bottom of the electrochromic device). The electrical connections 1075 and 1080 may be attached to the respective conductors of the piezoelectric transducer and the chromic device by any suitable conventional means such as solder, conductive adhesive, surface mount technology (SMT), etc.

One skilled in the art will appreciate that many variations are possible within the scope of the present invention. Thus, while the present invention has been particularly shown and described with reference to preferred embodiments thereof, it will be understood by those skilled in the art that these and other changes in form and details may be made therein without departing from the spirit and scope of the present invention.

What is claimed is:

1. An impact sensor, comprising:
 a chromic device having a first conductor, a second conductor, and a chromic material sandwiched between and operatively connected to the first conductor and the second conductor;
 a piezoelectric transducer having a first conductor, a second conductor, and a piezoelectric material sandwiched between and operatively connected to the first conductor and the second conductor;
 a first electrical connection electrically connecting the first conductor of the chromic device and the first conductor of the piezoelectric transducer; and
 a second electrical connection electrically connecting the second conductor of the chromic device and the second conductor of the piezoelectric transducer;
 wherein the chromic material changes from a first color state to a second color state in response to electric power generated by the piezoelectric transducer when exposed to a given level of impact force, wherein the chromic material is bistable so that the chromic material remains in the second color state for at least many minutes, wherein the chromic material is an electrochromic material comprising a viologen, and wherein the viologen changes through a color gradient of light transmission states from the first color state to the second color state;
 wherein at least a portion of at least one of the first and second conductors of the chromic device is substantially transparent so that the electrochromic material is visible through the substantially transparent portion;
 a printed color gradient key mounted near the chromic device, wherein the printed color gradient key includes:
  a photographic representation of two or more of the light transmission states; and
  indicia setting forth an impact force corresponding to each of the two or more light transmission states.

2. A shipping container, comprising:
 an impact sensor, comprising:
  a chromic device having a first conductor, a second conductor, and a chromic material sandwiched between and operatively connected to the first conductor and the second conductor;
  a piezoelectric transducer having a first conductor, a second conductor, and a piezoelectric material sandwiched between and operatively connected to the first conductor and the second conductor;
  a first electrical connection electrically connecting the first conductor of the chromic device and the first conductor of the piezoelectric transducer; and
  a second electrical connection electrically connecting the second conductor of the chromic device and the second conductor of the piezoelectric transducer;
  wherein the chromic material changes from a first color state to a second color state in response to electric power generated by the piezoelectric transducer when exposed to a given level of impact force, wherein the chromic material is bistable so that the chromic material remains in the second color state for at least many minutes, and wherein the chromic material is either an electrochromic material comprising a viologen or a thermochromic material;
  wherein the impact sensor is a corner wrap device that is folded over and attached to the shipping container at a corner where three orthogonal walls of the shipping container meet, wherein the impact sensor is a multi-axis impact sensor provided with three separate piezoelectric transducers each attached to a different one of the three orthogonal walls of the shipping container, and wherein each one of the three separate piezoelectric transducers is electrically connected to the chromic device so that the chromic device is shared by the three separate piezoelectric transducers.

3. A method for sensing impact, comprising the steps of:
 providing an impact sensor, comprising:
  a chromic device having a first conductor, a second conductor, and a chromic material sandwiched between and operatively connected to the first conductor and the second conductor;
  a piezoelectric transducer having a first conductor, a second conductor, and a piezoelectric material sandwiched between and operatively connected to the first conductor and the second conductor;
  a first electrical connection electrically connecting the first conductor of the chromic device and the first conductor of the piezoelectric transducer; and
  a second electrical connection electrically connecting the second conductor of the chromic device and the second conductor of the piezoelectric transducer;
  wherein the chromic material changes from a first color state to a second color state in response to electric power generated by the piezoelectric transducer when exposed to a given level of impact force, wherein the chromic material is bistable so that the chromic material remains in the second color state for at least many minutes, and wherein the chromic material is either an electrochromic material comprising a viologen, wherein the viologen changes through a color gradient of light transmission states from the first color state to the second color state;
  wherein at least a portion of at least one of the first and second conductors of the chromic device is substantially transparent so that the electrochromic material is visible through the substantially transparent portion;

subjecting the impact sensor to an unknown impact force; and quantifying the unknown impact force by observing the chromic device, wherein the step of quantifying the unknown impact force by observing the chromic device includes the step of:

comparing the color state of the chromic material to a printed color gradient key comprising a photographic representation of two or more of the light transmission states and indicia quantifying an impact force corresponding to each of the two or more light transmission states.

4. A method for sensing impact, comprising the steps of:

providing an impact sensor, comprising:
- a chromic device having a first conductor, a second conductor, and a chromic material sandwiched between and operatively connected to the first conductor and the second conductor;
- a piezoelectric transducer having a first conductor, a second conductor, and a piezoelectric material sandwiched between and operatively connected to the first conductor and the second conductor;
- a first electrical connection electrically connecting the first conductor of the chromic device and the first conductor of the piezoelectric transducer; and
- a second electrical connection electrically connecting the second conductor of the chromic device and the second conductor of the piezoelectric transducer;
- wherein the chromic material changes from a first color state to a second color state in response to electric power generated by the piezoelectric transducer when exposed to a given level of impact force, wherein the chromic material is bistable so that the chromic material remains in the second color state for at least many minutes, and wherein the chromic material is either an electrochromic material comprising a viologen or a thermochromic material; and attaching the impact sensor to a shipping container;

wherein the impact sensor is a multi-axis impact sensor provided with three separate piezoelectric transducers, wherein the step of attaching the impact sensor to the shipping container includes the step of:

folding and adhering the impact sensor over a corner of the shipping container where three orthogonal walls of the shipping container meet, wherein the impact sensor is positioned relative to the shipping container so that each one of the three separate piezoelectric transducers is attached to a different one of the three orthogonal walls of the shipping container, and wherein each one of the three separate piezoelectric transducers is electrically connected to the chromic device so that the chromic device is shared by the three separate piezoelectric transducers.

* * * * *